United States Patent
Li et al.

(10) Patent No.: US 11,714,694 B2
(45) Date of Patent: Aug. 1, 2023

(54) ERROR NOTIFICATION MECHANISM FOR STREAMING EVENTS

(71) Applicant: Salesforce, Inc., San Francisco, CA (US)

(72) Inventors: Dan Li, San Ramon, CA (US); Lawrence Eugenio McAlpin, Bloomington, IN (US); Brian St. Clair, Lutz, FL (US); Alex S. Warshavsky, Walnut Creek, CA (US)

(73) Assignee: Salesforce, Inc., San Francisco, CA (US)

( * ) Notice: Subject to any disclaimer, the term of this patent is extended or adjusted under 35 U.S.C. 154(b) by 561 days.

(21) Appl. No.: 16/678,946

(22) Filed: Nov. 8, 2019

(65) Prior Publication Data

US 2021/0141679 A1    May 13, 2021

(51) Int. Cl.
  *G06F 11/00* (2006.01)
  *G06F 9/54* (2006.01)

(52) U.S. Cl.
  CPC ........... *G06F 11/006* (2013.01); *G06F 9/542* (2013.01)

(58) Field of Classification Search
  CPC ................. G06F 11/006; G06F 9/542
  See application file for complete search history.

(56) References Cited

U.S. PATENT DOCUMENTS

| | | | |
|---|---|---|---|
| 5,557,798 A | 9/1996 | Skeen et al. | |
| 7,730,478 B2 | 6/2010 | Weissman | |
| 7,792,986 B2 * | 9/2010 | Donoho | H04L 67/53 709/224 |
| 8,448,186 B2 * | 5/2013 | Saxena | G06F 16/24532 719/314 |
| 8,583,587 B2 | 11/2013 | Warshavsky et al. | |
| 8,595,635 B2 * | 11/2013 | Krzanowski | H04L 63/08 715/713 |
| 8,973,106 B2 | 3/2015 | Warshavsky et al. | |
| 8,977,647 B2 | 3/2015 | Viripaeff et al. | |
| 9,219,775 B2 | 12/2015 | Cinarkaya et al. | |
| 9,628,412 B2 | 4/2017 | St. Clair et al. | |
| 9,628,493 B2 | 4/2017 | Warshavsky et al. | |
| 9,658,801 B2 | 5/2017 | Pradeep et al. | |
| 9,767,022 B2 | 9/2017 | Pradeep et al. | |
| 9,767,040 B2 | 9/2017 | Pradeep et al. | |

(Continued)

FOREIGN PATENT DOCUMENTS

| | | | | |
|---|---|---|---|---|
| EP | 2169875 A1 * | 3/2010 | | G06F 9/542 |
| EP | 4116827 A1 * | 1/2023 | | G06F 9/44505 |
| WO | WO-03083703 A1 * | 10/2003 | | G06Q 30/0241 |

OTHER PUBLICATIONS

US 11,044,333 B2, 06/2021, Ruiz-Meraz (withdrawn)*

(Continued)

*Primary Examiner* — Matthew M Kim
*Assistant Examiner* — Indranil Chowdhury
(74) *Attorney, Agent, or Firm* — Nicholson, De Vos, Webster & Elliott, LLP (57) ABSTRACT

A method for failure event notification in an event recordation and distribution system. The method including monitoring each stage of processing of an event by an event publisher manager, detecting a failure of the event to publish in the event recordation and distribution system, and publishing an error event notification to a status stream in response to detecting the failure.

21 Claims, 4 Drawing Sheets

(56) References Cited

U.S. PATENT DOCUMENTS

| | | |
|---|---|---|
| 9,785,782 B2 | 10/2017 | Bulumulla et al. |
| 10,037,316 B2 | 7/2018 | Mencke et al. |
| 10,049,131 B2 | 8/2018 | Torman et al. |
| 10,178,156 B2 | 1/2019 | Pradeep et al. |
| 10,275,281 B2 | 4/2019 | Pradeep et al. |
| 10,298,582 B2 | 5/2019 | Syomichev et al. |
| 10,332,129 B2 | 6/2019 | Torman et al. |
| 10,339,126 B2 | 7/2019 | Pradeep et al. |
| 10,380,094 B2 | 8/2019 | Warshavsky et al. |
| 10,452,462 B2 | 10/2019 | Oravivattanakul et al. |
| 10,536,463 B2 | 1/2020 | Syomichev et al. |
| 10,592,474 B2 | 3/2020 | Torman et al. |
| 10,664,455 B2 | 5/2020 | Oravivattanakul et al. |
| 10,666,712 B1* | 5/2020 | Dandekar ............... H04L 67/10 |
| 10,678,757 B2 | 6/2020 | Pradeep et al. |
| 10,776,186 B2 | 9/2020 | St. Clair et al. |
| 10,776,825 B2 | 9/2020 | Zhao |
| 10,812,608 B1 | 10/2020 | Thummala Abbigari et al. |
| 11,032,385 B2 | 6/2021 | Thummala Abbigari et al. |
| 11,533,538 B2 | 12/2022 | Li et al. |
| 2003/0195946 A1* | 10/2003 | Yang .................... H04L 45/306 709/219 |
| 2009/0019456 A1* | 1/2009 | Saxena ............. G06F 16/24532 719/318 |
| 2012/0096476 A1 | 4/2012 | Lee |
| 2012/0278473 A1* | 11/2012 | Griffiths ................ G06F 16/182 709/224 |
| 2012/0284331 A1* | 11/2012 | Kambatla ............. G06Q 10/06 709/204 |
| 2014/0310358 A1* | 10/2014 | Pignataro ............. H04L 67/562 709/206 |
| 2014/0366047 A1 | 12/2014 | Thomas et al. |
| 2018/0025113 A1 | 1/2018 | Torman et al. |
| 2018/0096012 A1 | 4/2018 | Warshavsky et al. |
| 2018/0096165 A1 | 4/2018 | Warshavsky et al. |
| 2018/0176174 A1 | 6/2018 | Sherman et al. |
| 2019/0058660 A1* | 2/2019 | Ruiz-Meraz ............ G06F 9/542 |
| 2019/0058772 A1* | 2/2019 | Ruiz-Meraz .......... H04L 67/327 |
| 2019/0089576 A1* | 3/2019 | Willhoit ............. G06F 11/3003 |
| 2019/0312871 A1 | 10/2019 | Syomichev et al. |
| 2019/0392114 A1 | 12/2019 | Cholas et al. |
| 2020/0174854 A1 | 6/2020 | Warshavsky et al. |
| 2020/0257574 A1* | 8/2020 | St. Clair ................ G06F 9/542 |
| 2021/0133180 A1 | 5/2021 | Thummala Abbigari et al. |
| 2021/0133181 A1 | 5/2021 | Thummala Abbigari et al. |
| 2021/0141679 A1 | 5/2021 | Li et al. |
| 2021/0144440 A1* | 5/2021 | Li .................... H04N 21/25891 |
| 2021/0240712 A1* | 8/2021 | Oscherov .......... G06F 16/24568 |
| 2022/0058036 A1* | 2/2022 | Wang .................... G06Q 10/10 |
| 2022/0150204 A1* | 5/2022 | Madhavan .............. H04L 47/50 |
| 2022/0155992 A1* | 5/2022 | Nortman ................. G06F 9/544 |

OTHER PUBLICATIONS

D. H. Zhang, Jing Bing Zhang, Yi Zhi Zhao and Ming Mao Wong, "Event-based communications for equipment supervisory control," 2005 IEEE Conference on Emerging Technologies and Factory Automation, 2005, pp. 7 pp. -347. (Year: 2005).*

L. Vargas, L. I. W. Pesonen, E. Gudes and J. Bacon, "Transactions in Content-Based Publish/Subscribe Middleware," 27th International Conference on Distributed Computing Systems Workshops (ICDCSW'07), 2007, pp. 68-68 (Year: 2007).*

C. Esposito and M. Ciampi, "On Security in Publish/Subscribe Services: A Survey," in IEEE Communications Surveys & Tutorials, vol. 17, No. 2, pp. 966-997, Secondquarter 2015 (Year: 2015).*

R. Baldoni, S. Bonomi, M. Platania and L. Querzoni, "Efficient Notification Ordering for Geo-Distributed Pub/Sub Systems," in IEEE Transactions on Computers, vol. 64, No. 10, pp. 2796-2808, Oct. 1, 2015 (Year: 2015).*

A. B. Mnaouer, A. Aendenroomer and L. Hismanto, "An event chain notification and management system using SMS," 2004 IEEE International Conference on Industrial Technology, 2004. IEEE ICIT '04., Hammamet, Tunisia, 2004, pp. 813-818 vol. 2 (Year: 2004).*

C. Esposito, M. Platania and R. Beraldi, "Reliable and Timely Event Notification for Publish/Subscribe Services Over the Internet," in IEEE/ACM Transactions on Networking, vol. 22, No. 1, pp. 230-243, Feb. 2014 (Year: 2014).*

Non-Final Office Action, U.S. Appl. No. 16/678,962, dated Oct. 1, 2020, 10 pages.

Final Office Action, U.S. Appl. No. 16/678,962, dated Apr. 30, 2021, 13 pages.

Final Office Action, U.S. Appl. No. 16/678,962, dated May 4, 2022, 17 pages.

Non-Final Office Action, U.S. Appl. No. 16/678,962, dated Aug. 19, 2021, 15 pages.

Notice of Allowance, U.S. Appl. No. 16/678,962, dated Aug. 17, 2022, 9 pages.

* cited by examiner

ERROR NOTIFICATION MECHANISM FOR STREAMING EVENTS

TECHNICAL FIELD

One or more implementations relate to the field of event consumption; and more specifically, to the handling of errors in publishing of events in an event recordation and distribution system.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience.

The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

Event recordation and distribution systems can be utilized to manage data distribution in these types of systems. In current event recordation and distribution systems, a high volume of events is published by multiple event producers and then delivered to multiple consumers. The event recordation and distribution system is a large scale, asynchronous, distributed system where failures are inevitable due to network failures, equipment failures and similar issues. Event publishing is asynchronous. As a result, event consumers can be unaware of event publishing errors, such as those caused by network and equipment failures, which can have significant impact on the event consumers. In many cases, event data is irrevocably lost and cannot be published.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for tracking events to enable identification of events that are lost due to failures in the event recordation and distribution system. In some embodiments, the event publishers can be notified of the event publication failures and the event publisher can be notified of the identity and content of the lost event.

Exemplary System

Figure 1:
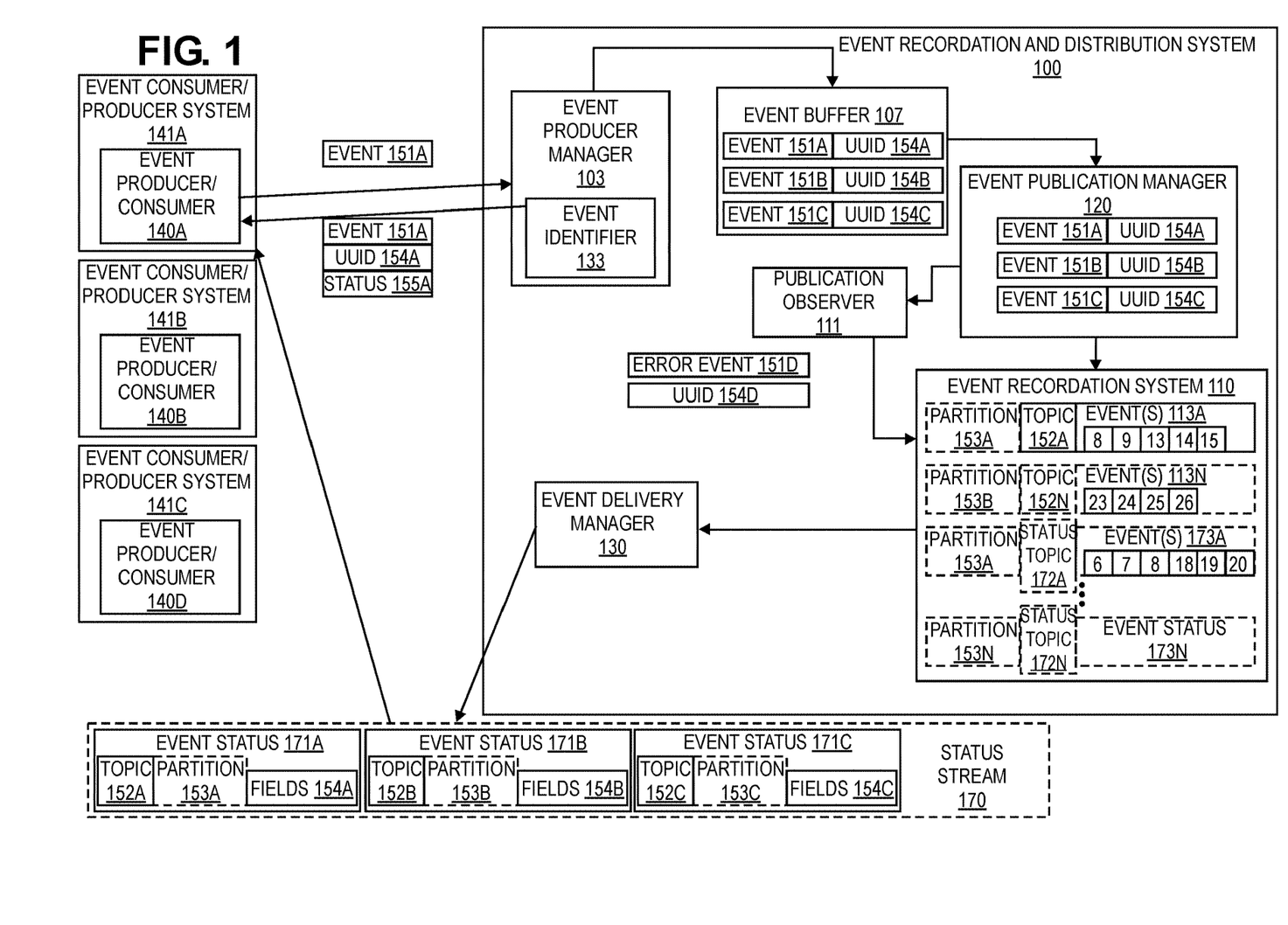
FIG. 1 is a block diagram illustrating an asynchronous error notification system according to some example implementations.

FIG. 1 is a block diagram illustrating an asynchronous error notification system according to some example implementations. Event recordation and distribution system 100 (which may alternatively be referred to as the system 100) includes an event recordation system 110, an event publication manager 120, an event delivery manager 130, a publication observer 111, a set of one or more event consumer and/or producer systems 141A-C, an event producer manager 103, an event buffer 107, and similar components.

An event (e.g., 151A-151C) in the system 100 is an identifiable unit of data that conveys information about operations that occur in a system (e.g., measurements recorded in an IoT device, actions performed by a user of a social networking system, failures of an operation or a system, etc.). The operations can be user-generated or system-generated. In some implementations, an event is associated with a topic. A topic can be information or details on the event that can be used to group one or more events, to publish the events, and to deliver the events to event consumers 140A-C. In some implementations, an event can also be associated with a partition. The partition can be information on the event, which can be used to group multiple events. The partition and topic can be used to group events with the same topic and partition and can be used to transmit these events to one or more event consumers 140A-C that requests them based on the partition and/or topic they are associated with. In a non-limiting example of a multi-tenant platform, the partition can be a tenant identifier (which can also be referred to as an organization identifier (org_ID)) where each one of the tenant identifiers uniquely identifies a tenant within the system. The topic can be a word or alphanumerical value added to an event generated in the system. Other examples of topics or partitions can be contemplated without departing from the scope of the present implementations.

In some implementations an event is associated with a topic when it is generated by an event producer 140A-C. In some implementations, the event is also associated with a partition. The topic and/or partition can be added to the event as an additional field to the other data included in the event. The topic and partition can be used as a schema to store and retrieve the event in an event recordation system 110, when this event recordation system is a database. Each event is associated with a universal unique identifier (UUID). The UUID identifies the event in the event recordation and distribution system. The UUID is assigned sequentially to events during publishing of the events by an event identifier 133 in the event producer manager 103. The UUID can be any unique value such that there is a 1:1 relationship between an event and the correlate UUID at any time.

The UUID enables a publication observer 111 to track the processing of each event in the event recordation and distribution system 100. The UUID also enables the generation of an event status stream by the event delivery manager 130 to indicate the status of events processed by the event recordation and distribution system 100. Each event is published through execution of a transaction that is asynchronous with execution of other transactions for publishing subsequent events of a given topic. Each transaction commits the event (i.e., stores the event) in an order that is independent of the order the events are received or assigned to a topic. Thus, the order by which events are stored in the event recordation system 110 can be different from an expected order. There are also many different types of errors that can cause the execution of a transaction related to an event to fail. As mentioned, a network or device error can cause a failure or loss of an event transaction at any stage within the event recordation and distribution system 100, because the event recordation and distribution system can be implemented in a distributed manner over any number of networked devices.

The implementations described herein propose a mechanism for tracking of events within the event recordation and distribution system 100 that enable event consumers 140A-C to be notified in case that an error has resulted in a failure of a transaction related to an event. In order for event producers 140A-C to receive error information, the event producers 140A-C are provided with the UUID of each event that they generate and the event producers 140A-C can subscribe to the status stream 170 that provide event status information including error notifications along with information about the events in the error notifications.

In one example implementation, a first event 151A of a first topic is generated by an event producer 140A-C is received by the event recordation and distribution system 100. Each event is received at an event producer manager 103 where an event identifier assigns each event a UUID. The events and UUIDs are stored in an event buffer 107 to await further processing. Each UUID is unique to the associated event at least within a given timeframe to ensure that an event can be accurately identified and tracked. The event identifier 133 generates and associates the UUID with each event. The operation of the event identifier 133 is further described herein below with relation to FIG. 2A. A publication observer 111 tracks the processing of each event by the event publication manager 120. Where an error occurs or similar action, then the publication observer 111 generates an error event 151D for the UUID of the event that is published to the status stream 170 to thereby notify the event producer 140A-C of the error. The operation of the publication observer 111 is further described herein below with relation to FIG. 2B.

The above implementations are advantageous as compared to some conventional systems. For example, a first conventional system processes event publication transactions, but in cases of an error in handling an event, then the event producer 140A-C is unaware of the error and more is unaware of any details related to the error such that the event producer 140A-C is unable to re-publish the event or make corrections to enable the publication of the event.

Additional Details about the Event Recordation and Distribution System 100

The event recordation and distribution system 100 can receive a stream of events, e.g. multiple events 151A-C and is operative to store the events in the event recordation system (e.g., 110) and enable consumption/delivery of the events to a set of event consumers 140A-C, which may also be producers at a set of event consumer/producer systems 141A-C. In some implementations, the stream of events 150 can be received by an event producer manager 103 that manages the receipt of streams generated by one or more event producers 140A-C (e.g., IoT devices, and/or application data source(s)). The application data sources may include various applications running on software-as-a-service (SaaS), platform-as-a-service (PaaS) and/or infrastructure-as-a-service (IaaS) infrastructures. The applications can also include other types of distributed or non-distributed applications that produce streams of events.

Examples of events include device logs, clicks on links, impressions of recommendations, numbers of logins on a particular client, server logs, user's identities (sometimes referred to as user handles or user IDs and other times the users' actual names), content posted by a user to a respective feed on a social networking service, social graph data, metadata including whether comments are posted in reply to a prior posting, another event, or an article, and so forth. Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

In some implementations, terabytes of events per hour arrive for processing. In some implementations, the events are published to the recordation and distribution system 100 to be stored in one of multiple event recordation systems and intended to be consumed, in real-time, pseudo-real time, or on-demand, by one or more event consumers 140A-C such as event consumers 140A-H.

Each stream of events can include multiple events. For example, a stream can include events 151A-C. Each event from the stream includes a topic, and one or more additional fields. The event may also include a partition. For example, the partition can include a tenant identifier. The additional fields can be referred to as a payload of the event. For example, event can have a topic, an optional partition, and one or more additional fields. Events of a stream may have one of multiple partitions and/or topics. Some events may share the same partition and/or the same topic.

In some implementations, when a partition refers to a tenant identifier in a multi-tenant environment, all events received with that same partition belong to the same tenant. When the topic is an alphanumerical value entered by a user of the multi-tenant system to be associated with a record, an account, a task, etc., some events of a stream may have the same topic. The topics allow the event consumers to request the events stored in the event recordation system 110. While the events are described as having a respective topic and partition, in some implementations, each event may only have a topic. The partition is an optional field that can be omitted in some implementations. For example, when the partition represents the identification of a tenant, when operating in a single tenant system, the events may not have a tenant identifier and therefore only a topic can be included in an event to enable event consumers to receive the events based on the topic.

Each instance from the instances of event consumers 140A-C is a process that is being executed on one or more servers of a distributed computing platform referred to here as event consumer/producer systems 141A-C. The process of each event consumer 140A-C is the actual execution of program code including instructions that form a computer program. Several instances may be associated with the same program code. For example, in a multi-tenant system, a first event consumer 140A is dedicated to a first tenant and a second event consumer 140C may execute the same code and be dedicated to a second tenant that is different from the first tenant.

The event consumers 140A-C are operative to request and consume events stored in the event recordation systems 110 based on the topic (and/or the partitions). The event consumers 140A-C can be used for gaining insight on the data embedded in the events, for gaining insight on the operations and actions performed in the applications and/or the IoT devices, and/or for gaining insight on the environment controlled or measured by the IoT devices and/or applications. In some implementations, the instances of the event consumers can request to obtain the events and process the events to perform one or more of audit, debug and support, forensic and compliance, and/or analytics of the applications and IoT devices. In some implementations, the event consumers 140A-C may be implemented in a distributed computing environment, where multiple instances of event consumers can be run on one or more servers. The event consumers 140 can be owned and operated by a same entity such as a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). Alternatively, the one or more event consumers can be operated by multiple entities such as different customers of an event recordation and distribution service.

The event recordation and distribution system 100 may include an event publication manager 120 that is operative to handle how and where the events are recorded/stored in one or more of the event recordation systems such as event recordation system 110. In some implementations, the event publication manager 120 may be external to the event distribution and recordation system 100. In other implementations, the event publication manager 120 may be part of the event distribution and recordation system 100. In some implementations, the event publication manager 120 is monitored by the publication observer 111 to ensure that each event 151A-C is successfully processed and recorded in the event recordation system 110. For example, upon receipt of the events 151A, 151B and 151C, the event publication manager 120 organizes and stores these in the event recordation system according to topic and/or partition in the order they are received.

In some implementations, the publishing order is defined when a publishing transaction is initiated. The completion of the execution of the publishing transaction result in the event being stored in the event recordation system 110. However, in some cases, the publishing of the event may fail. In such cases the publication observer 111 can record an error event 151D and UUID 154D of the failed event to the event recordation system 110 to be published as part of the status stream 170.

In the event recordation system 110 the events are grouped with an associated topic (and in some implementations based on a topic and a partition). Each event is stored with a respective replay identifier as assigned by the event publication manager 120. In the illustrated example, only replay identifiers are shown for the events stored in the event recordation system 110. One of ordinary skill in the art would understand that each event stored may include additional fields not illustrated. The event recordation system 110 includes a first set of events 113A stored for a first topic 152A, and events 113N stored for topic 152N. Any number of topics can be included and events for these topics stored in the event recordation system 110 without departing from the scope of the implementations described herein. While the events are published in a given order (identified by successive and continuous replay identifier), the events may not be stored in that same order such that there may be discontinuities when of events when the events are consumed by event consumers.

In some implementations, one or more event status streams are also stored in the event recordation system 110 with each event recordation stream being defined with a different event status topic 172A-N and optionally partition (e.g., partitions 153A and 153B). Similar to regular event topics, a set of events is associated with each event status topic (e.g., events 6, 7, 8, 18, 19 and 20 173A associated with topic 172A). An event delivery manager 130 published an status stream 170 in a manner similar to other event streams.

In some implementations, the event recordation system 110 may be one of several types of event recordation systems. For example, event recordation system 110 may be a messaging system implemented based on a publish/subscribe platform, or a long-term storage non-relational database. Alternatively, other types of data structure systems can be used for implementing the event recordation system 110 such as relational databases, etc. In some implementations, the event recordation system 110 is a short-term storage medium, where the events have a time to leave associated with them after which they expire, and they are deleted from the system.

The system may further include an event delivery manager 130 that is coupled with the event recordation system 110 and is operative to receive requests from the event consumers 140A-C for events associated with an identified topic (or a topic and partition) and responds to these requests by transmitting events to the event consumers.

The event delivery manager 130 is operative to receive batches of events for one or more topics from the event recordation system 110 and delivers the events without any discontinuities to the event consumers 140. In some implementations, the receipt of a batch of events for a given topic (e.g., topic 152A, topic 152N, or status topics 172A-N) is a result of a request transmitted from an event consumer (e.g., 140A-C) to the event recordation system 110. The request is sent through the event delivery manager 130. In some implementations, transmitting a request includes subscribing to a topic. In some implementations, each event consumer is operative to subscribe to one or more topics and one or more status topics. Alternatively, each event consumer can subscribe to a single topic and/or status topic. The event delivery manager 130 is operative to manage the subscription and delivery of the events based on the received subscription requests. In some implementations, upon receipt of a request from an event consumer (e.g., a subscription to a topic), the event delivery manager 130 transmits the request to the event recordation system 110. For example, the event delivery manager 130 can in turn subscribe to the topic (and status topic) to receive the events prior to their delivery to the event consumer. The subscription can be made at an earlier time (prior to the receipt of the events) and events are continuously transmitted to the event delivery manager 130 based on this earlier subscription. The subscription can be a new subscription and only new events are transmitted.

Figure 2A:
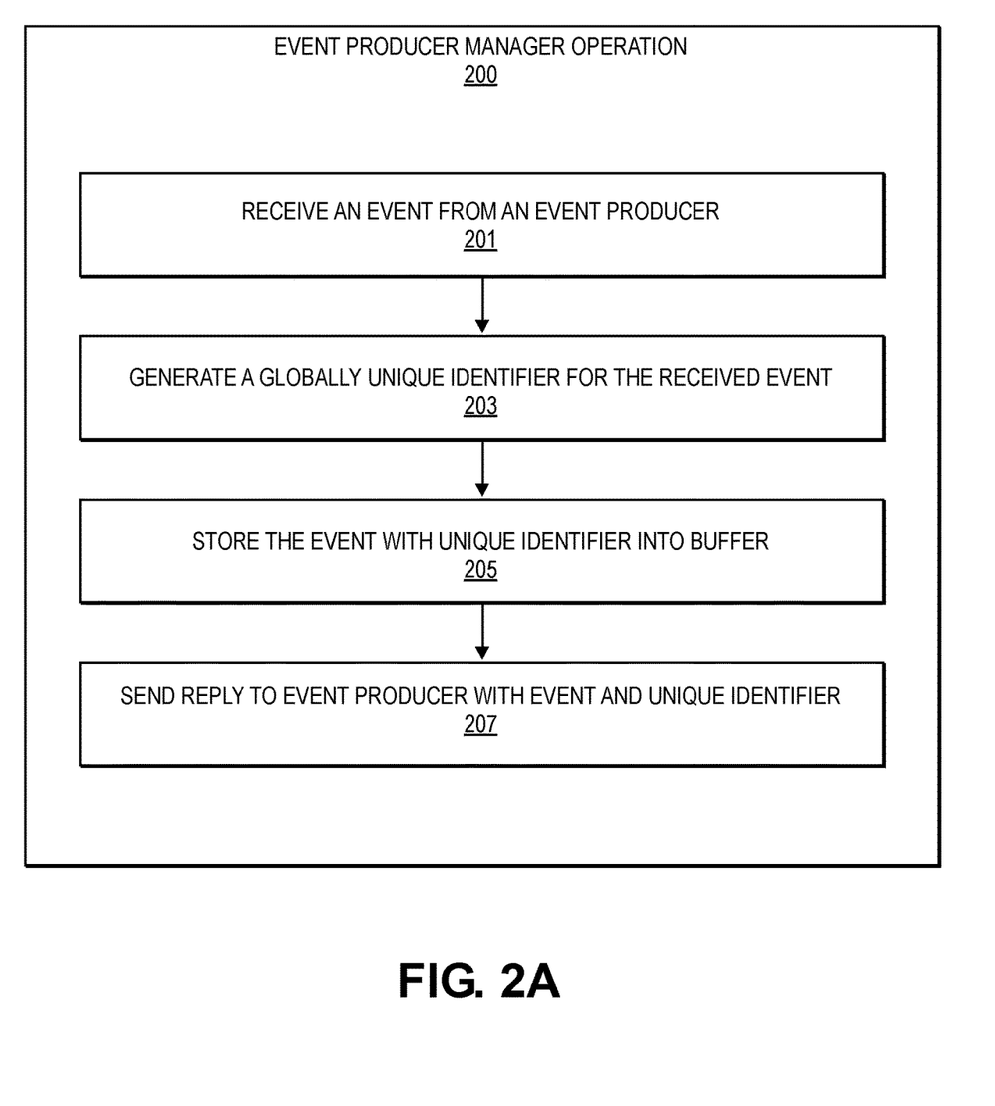
FIG. 2A is a flow diagram illustrating the operation of an event producer manager operation according to some example implementations.

FIG. 2A is a flow diagram illustrating the operation of an event producer manager operation according to some example implementations (Block 200). The event producer manager receives events for the event recordation and distribution system from any number of event producers (Block 201). Events can be received individually or in batches. In some implementations, the event producer manager includes an event identifier that handles the generation of UUIDs for each received event. In other implementations, the UUID generation and assignment functions are integrated or alternatively separately implemented from the event producer manager. The UUID can be generated using any algorithm that results in a generation of a unique identifier specific to an event (Block 203). The UUIDs can be sequentially assigned numbers, hashes of received events, or similarly generated values. The values can be integers, binary, alphanumeric, or any other type of value. Each event is given a separate UUID regardless of whether the event is received separately or in a batch. The UUID can be added to a field of the event or can be separately tracked and stored from the event.

The event and the UUID are stored into a buffer to await further processing by the event publication manager (Block 205). The immediate assignment of the UUID and storage in a buffer upon receipt of the event ensures that the event can be tracked within the event recordation and distribution system. The buffer can be an event buffer 107 that stores received events that await processing by the event publication manager before storage in the event recordation system. The UUID can follow the event throughout the event recordation and distribution system as a field of the event or separately stored. Upon assignment and storage of the UUID with the event in the buffer, the event producer manager sends the UUID to the event producer to confirm receipt and storage of the event (Block 207). If an event producer fails to receive a UUID as an acknowledgement of an event sent by the event producer, then the event producer can assume that the event was not properly received and processed by the event recordation and distribution system. The event producer can resend or similarly handle this failure.

The event producer can separately subscribe to the event status stream of the event recordation and distribution system. This will enable the event producer to monitor for information that can indicate an error in the event handling for any event by monitoring the event status stream for notification of event status that include the UUIDs of events of the event producer. In some implementations, the event producer manager returns the received event along with an assigned UUID and status information (e.g., stored in buffer) or similar information to the event producer in response to the receipt of an event from that event producer.

Figure 2B:
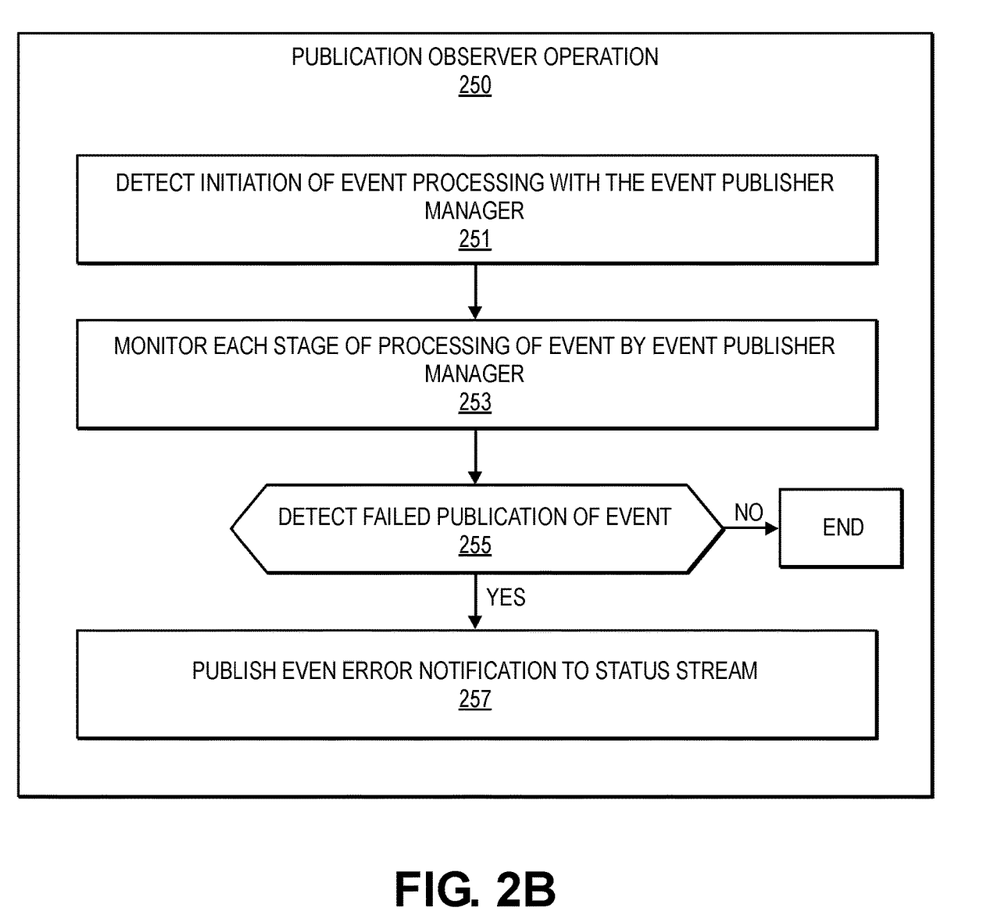
FIG. 2B is a flow diagram illustrating the operation of a publication observer according to some example implementations.

FIG. 2B is a flow diagram illustrating the operation of a publication observer according to some example implementations. The publication observer tracks the operation of the event publisher to detect failures related to events being processed by the event publisher. The event publisher can have multiple stages of event processing and these stages can be implemented by multiple devices within a distributed system. The event publisher begins monitoring each event and its UUID as they are retrieved for processing by the event publisher from the buffer (Block 251). As each stage of the event publisher completes and starts the publication observer monitors that the processing of the event did not generate any errors (Block 253). If at any stage an error is generated, the publication observer collects the error information to be returned to the event producer.

In response to detecting an error at a stage of the event publisher manager (Block 255), the publication observer collects a copy of the event, any event error information provided by the event publisher manager, and the UUID to generate an event status that includes this information. This event status is published to the event status stream (Block 257) in a manner similar to that of event publication, where the publication observer stores the error event (e.g., error event 151D and UUID 154D in FIG. 1) to the event recordation system in an event status stream based on status topic and partition information associated with the failed event. The event delivery manager then publishes the event status stream that can be subscribed to by the event producer to thereby provide error notification to the event producer. Error information can be stored in a set of fields for the error status. The error status can also include a payload section in some implementations that can store a copy of the error or other error information.

If no errors are detected for an event and/or UUID then the publication observer can end monitoring of the event and/or UUID. In some alternate implementations, a successful publication of an event can also be a basis for a status update to the event producer in an error status stream or similar event stream that the event producer can subscribe to in a similar manner.

While the implementations herein are described with respect to a single event consumer receiving events for a given topic, in other implementations multiple event consumers may receive events of a topic. These events can be duplicated by the event delivery manager to be transmitted to multiple event consumers. The events are still transmitted in the same order for all event consumers to ensure integrity and continuity of the event replay identifiers.

The implementations of the present application describe a mechanism for event tracking events in the event recordation and distribution system such that errors can be detected, and notifications can be sent to event producers that subscribe to an error event stream.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3A:
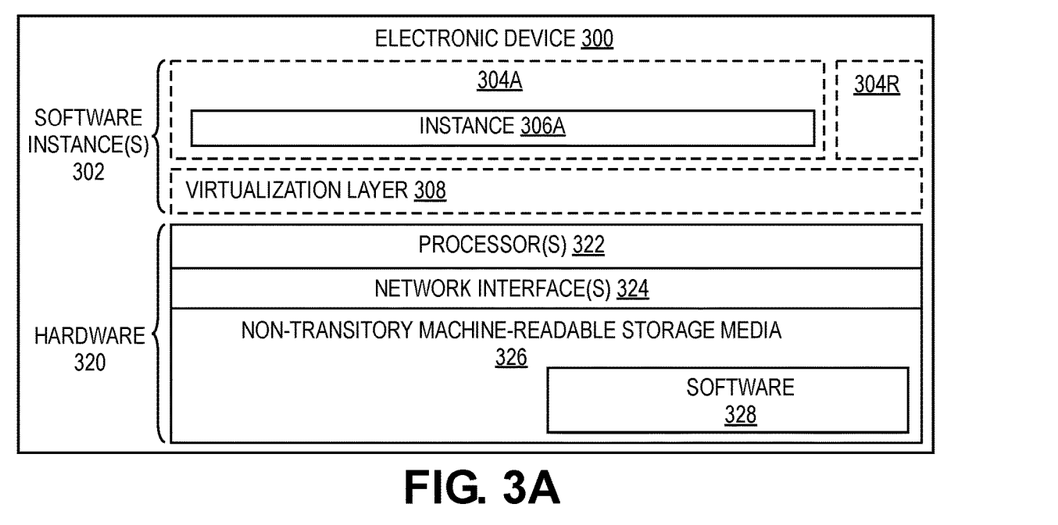
FIG. 3A is a block diagram illustrating an electronic device, in accordance with some implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described event producers and consumers and the event recordation and distribution system may be implemented in one or more electronic devices 300. In one implementation: 1) each of the event producer/consumers is implemented in a separate one of the electronic devices 300 (e.g., in event producer/consumer systems operated by users where the software 328 represents the software to implement event producer/consumers to interface with the event recordation and distribution system (e.g., a web browser, a native client, a portal, a command-line interface, and/or an application program interface (API) based upon protocols such as Simple Object Access Protocol (SOAP), Representational State Transfer (REST), etc.)); 2) the event recordation and distribution system is implemented in a separate set of one or more of the electronic devices 300 (e.g., a set of one or more server electronic devices where the software 328 represents the software to implement the event recordation and distribution system); and 3) in operation, the electronic devices implementing the event producer/consumers and the event recordation and distribution system would be communicatively coupled (e.g., by a network) and would establish between them (or through one or more other layers) connections for transmitting events and related data to and from the event recordation and distribution system and returning event and status streams to the event producer/consumers. Other configurations of electronic devices may be used in other implementations (e.g., an implementation in which the event producer/consumer and the event recordation and distribution system are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 3B:
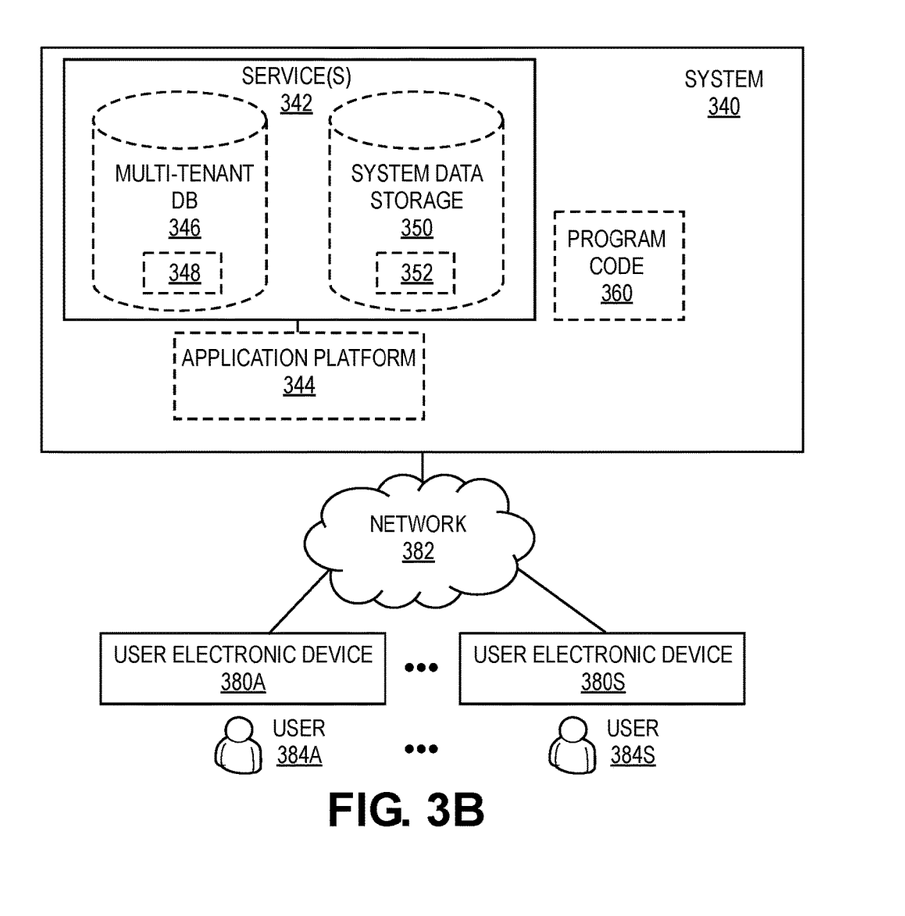
FIG. 3B is a block diagram of an environment where a mechanism for event delivery may be deployed, in accordance with some implementations.

FIG. 3B is a block diagram of an environment where an event recordation and distribution system may be deployed, according to some implementations. A system 340 includes hardware (a set of one or more electronic devices) and software to provide service(s) 342, including the event recordation and distribution system. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communication with each other and/or with one or more of the user electronic devices 380A-S via one or more Application Programming Interface(s) (APIs) (e.g., a Representational State Transfer (REST) API). The user electronic devices 380A-S are operated by users 384A-S.

In one implementation, the system 340 is a multi-tenant cloud computing architecture supporting multiple services, such as the event recordation and distribution system, customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, one or more of the service(s) 342 may utilize one or more multi-tenant databases 346 for tenant data 348, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the XYZ service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation.

Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of failure event notification in an event recordation and distribution system, the method comprising:
    monitoring each stage of processing of an event by an event publisher manager;
    detecting a failure of the event to publish in the event recordation and distribution system; and
    publishing an error event notification to a status stream in response to detecting the failure, wherein the status stream may be subscribed to by one or more event producers,
    wherein an event producer is notified of the failure if the event producer is subscribed to the status stream, and not notified of the failure if the event producer is not subscribed to the status stream.

2. The method of claim 1, further comprising:
    detecting initiation of processing of the event by the event publisher manager.

3. The method of claim 1, wherein the error event notification includes a unique identifier for the event.

4. The method of claim 1, further comprising:
    generating a unique identifier for the event by an event producer manager.

5. The method of claim 4, further comprising:
    storing the event with the unique identifier into a buffer to be processed by the event publisher manager.

6. The method of claim 4, further comprising:
sending a reply to an event producer with the unique identifier in response to receiving the event.

7. The method of claim 1, wherein the error event notification includes a payload of the event.

8. A non-transitory machine-readable storage medium that provides instructions that, if executed by a processor, will cause said processor to perform operations of a method of failure event notification in an event recordation and distribution system, the operations comprising:
monitoring each stage of processing of an event by an event publisher manager;
detecting a failure of the event to publish in the event recordation and distribution system; and
publishing an error event notification to a status stream in response to detecting the failure, wherein the status stream may be subscribed to by one or more event producers,
wherein an event producer is notified of the failure if the event producer is subscribed to the status stream, and not notified of the failure if the event producer is not subscribed to the status stream.

9. The non-transitory machine-readable medium of claim 8, wherein the operations further comprise:
detecting initiation of processing of the event by the event publisher manager.

10. The non-transitory machine-readable medium of claim 8, wherein the error event notification includes a unique identifier for the event.

11. The non-transitory machine-readable medium of claim 8, wherein the operations further comprise:
generating a unique identifier for the event by an event producer manager.

12. The non-transitory machine-readable medium of claim 11, wherein the operations further comprise:
storing the event with the unique identifier into a buffer to be processed by the event publisher manager.

13. The non-transitory machine-readable medium of claim 11, wherein the operations further comprise:
sending a reply to an event producer with the unique identifier in response to receiving the event.

14. The non-transitory machine-readable medium of claim 8, wherein the error event notification includes a payload of the event.

15. A computing device to implement a method of failure event notification in an event recordation and distribution system, the computing device comprising:
a non-transitory computer-readable medium having stored therein a publication observer; and
a processor coupled to the non-transitory computer-readable medium, the processor to execute the publication observer, the publication observer to monitor each stage of processing of an event by an event publisher manager, to detect a failure of the event to publish in the event recordation and distribution system, and to publish an error event notification to a status stream in response to detecting the failure, wherein the status stream may be subscribed to by one or more event producers, wherein an event producer is notified of the failure if the event producer is subscribed to the status stream, and not notified of the failure if the event producer is not subscribed to the status stream.

16. The computing device of claim 15, wherein the publication observer is further to detect initiation of processing of the event by the event publisher manager.

17. The computing device of claim 15, wherein the error event notification includes a unique identifier for the event.

18. The computing device of claim 15, wherein the non-transitory computer-readable medium is further to store an event producer manager, the processor to execute the event producer manager, the event producer manager to generate a unique identifier for the event.

19. The computing device of claim 18, wherein the event producer manager is further to store the event with the unique identifier into a buffer to be processed by the event publisher manager.

20. The computing device of claim 18, wherein the event producer manager is further to send a reply to an event producer with the unique identifier in response to receiving the event.

21. The computing device of claim 15, wherein the error event notification includes a payload of the event.

* * * * *